UNITED STATES PATENT OFFICE.

EUGEN FISCHER AND JULIUS OPPERMANN, OF BIEBRICH, GERMANY, ASSIGNORS TO KALLE & CO., OF SAME PLACE.

INDIGO-SALT AND PROCESS OF DYEING WITH SAME.

SPECIFICATION forming part of Letters Patent No. 540,427, dated June 4, 1895.

Application filed January 28, 1895. Serial No. 536,489. (Specimens.) Patented in Germany January 8, 1893, No. 73,377; in England February 27, 1893, No. 4,287, and in France March 1, 1893, No. 228,300.

*To all whom it may concern:*

Be it known that we, EUGEN FISCHER, doctor of philosophy, a subject of the King of Würtemberg, and JULIUS OPPERMANN, doctor of philosophy, a subject of the King of Prussia, residing at Biebrich-on-the-Rhine, Germany, have invented a new body, called "Indigo-Salt," either by itself or in the textile fiber, which can be transformed into indigo, (for which patents have been obtained in the following countries: Germany, No. 73,377, dated January 8, 1893; France, No. 228,300, dated March 1, 1893, and England, No. 4,287, dated February 27, 1893,) of which the following is a specification.

The numerous experiments, which were made more than ten years ago in order to utilize in practice the synthesis of indigo, discovered by Baeyer and his collaborators have not led to any practical process for the production of artificial indigo in spite of repeated endeavors. All the processes hitherto recommended were much too expensive and no artificial indigo has been brought into commerce. For the same reasons it was also not possible to introduce the articles recommended for the production of artificial indigo upon the fiber. In 1882, Baeyer and Drewsen have described in the *Berichte der Deutschen Chemischen Gesellschaft*, XV, page 2,856, the ortho-nitro-phenyl-lacto-ketone, a product of the action of diluted caustic soda-lye upon a mixture of acetone and ortho-nitro-benzaldehyde. This ketone, as it is known, can be transformed into indigo when further treated with caustic soda-lye. This product has likewise found no practical application, partly owing to the difficulty of manufacturing it in a pure state, partly on account of its difficult solubility in water. By reason of our invention it is now possible to produce this body, the ortho-nitro-phenyl-lacto-ketone, on a manufacturing scale in a state of purity and to transform the same into a compound soluble in water, which enables us to employ it for the production of artificial indigo on the fiber.

If the crude product of the action of caustic soda-lye upon acetone and ortho-nitrobenzaldehyde is treated with an aqueous solution of sodium bisulfite or with the solution of any other acid sulfite, a solution of our new compound is obtained, while the impurities remain in the undissolved residue. The solution has now only to be filtered and neutralized in order to yield a precipitate of pure ortho-nitro-phenyl-lacto-ketone. The just described solution of the ketone in sodium bisulfite contains a chemical compound having the formula

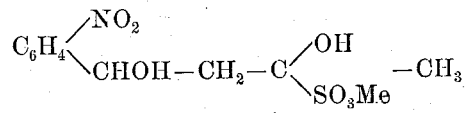

in which Me stands for the metal corresponding to the bisulfite used. This compound crystallizes on cooling especially from concentrated solutions in the form of needles or leaflets, the composition of which is characterized, when sodium bisulfite is used, by the formula:

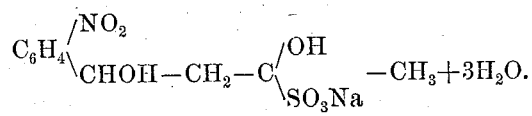

Such compounds we call "indigo salt." If the aqueous solution of this indigo salt, or the original bisulfite solution, from which it was crystallized, is treated with small quantities of alkali, either alkali-carbonates or caustic alkali, the unchanged ortho-nitro-phenyl-lacto-ketone is separated as a finely divided precipitate. On addition of more alkali, indigo is then formed. This bisulfite compound, the indigo salt, is readily soluble in water, melts at fifty to sixty degrees centigrade (50° to 60° C.) and decomposes at a higher temperature.

In order to produce our indigo salt we proceed as follows: We dissolve one (1) part of crude or pure ortho-nitro-phenyl-lacto-ketone in about two (2) parts of sodium-bisulfite-solution of about forty per cent. NaHSO$_3$ preferably at a temperature of forty to fifty degrees centigrade (40° to 50° C.). In the place of sodium bisulfite, any other bisulfite can be used, of course with the alterations depending upon its particular properties. If the crude ketone has been employed the liquor has to be filtered, and on cooling the whole mass is transformed into a thick crystalline paste. The so obtained paste, which is soluble in water, or the equally soluble powder, prepared by pressing, drying and grinding the paste, represents two forms of our new commercial product which we desire to secure by Letters Patent.

The above described paste is liquefied at thirty-five to forty degrees centigrade (35° to 40° C.) and becomes milky at about fifty-three degrees centigrade (53° C.) by separation of free ketone, which is redissolved on cooling. The easy solubility in water of the bisulfite-compound of the ortho-nitro-phenyl-lacto-ketone discovered by us, enables us to impregnate textile fabrics with indigo-salt so evenly that they are dyed fast indigo-blue shades when treated subsequently with an excess of alkali. These textile fabrics impregnated with our indigo salt represent also a form of our commercial product and an object of our invention. In appearance they are little different from the original unprepared fabrics, but they have acquired the property of turning indigo-blue on treatment with alkalies, which is easily comprehensible in view of the above described properties of our indigo salt.

In order to produce indigo-blue on the fiber we can proceed as follows:—The fabric is steeped in a solution of indigo salt or in the original solution of the ketone in sodium-bisulfite and is then well wrung. The so obtained fabric can be used either directly or after it has been dried. To develop the color the so prepared fabric has now only to be brought into an aqueous solution of alkali, whereupon it is washed well and dried. The material is then dyed evenly a part indigo-blue. If however it is desired to dye only certain parts of a knit or woven fabric, as for instance, in calico printing, the alkali mixed with a suitable thickening is printed on the fabric impregnated as described. It is then washed out. Those parts of the cloth which are touched by the alkaline printing paste are then dyed indigo blue, while the ketone or the bisulfite compound is washed away in those parts where it has not been developed into indigo. The same result can of course be obtained by mixing the indigo salt or its aqueous solution with a suitable thickening and by printing the so obtained printing color upon the fabric. Goods thus prepared are also subjects of our invention. In this case as well as in the above described the printed parts appear dyed with indigo, if the fabrics are passed through a solution of alkali.

What we claim as our invention, and desire to secure by Letters Patent, is—

1. The process for the production of the bisulphite compound of ortho-nitro-phenyl-lacto-ketone, called indigo salt, by treating this ketone with aqueous solutions of any bisulfite, such as sodium bisulfite substantially as described.

2. As a new article of manufacture, the bisulphite-compound of the ortho-nitro-phenyl-lacto-ketone, called indigo salt, which is readily soluble in water, melts at 50° to 60° centigrade, and decomposes at a higher temperature, which may be obtained by the above described process from ortho-nitro-phenyl-lacto-ketone by treatment with a solution of bisulfite, substantially as described.

3. The process herein described of dyeing or printing textile fiber, which consists in combining upon said fiber the bisulfite indigo salt with an alkali, substantially as described.

In testimony whereof we have signed our names to this specification in the presence of two subscribing witnesses.

E. FISCHER.
JUL. OPPERMANN.

Witnesses:
EDWARD J. PRICKETT,
W. KISSEL.

It is hereby certified that in Letters Patent No. 540,427, granted June 4, 1895, upon the application of Eugen Fischer and Julius Oppermann, of Biebrich, Germany, for an improvement in "Indigo-Salt and Processes of Dyeing with Same," an error appears in the printed specification requiring correction, as follows: In line 38, page 2, the word "part" should read *fast;* and that the said Letters Patent should be read with this correction therein that the same may conform to the record of the case in the Patent Office.

Signed, countersigned, and sealed this 11th day of June, A. D. 1895.

[SEAL.]
JNO. M. REYNOLDS,
*Assistant Secretary of the Interior.*

Countersigned:
JOHN S. SEYMOUR,
*Commissioner of Patents.*